United States Patent
Tamburrini

[11] Patent Number: 5,962,838
[45] Date of Patent: Oct. 5, 1999

[54] BARCODE SCANNER WITH MANUALLY SWITCHABLE SCAN PATTERNS

[75] Inventor: Thomas E. Tamburrini, Eugene, Oreg.

[73] Assignee: PSC Scanning, Inc., Eugene, Oreg.

[21] Appl. No.: 08/887,244

[22] Filed: Jul. 2, 1997

Related U.S. Application Data

[60] Provisional application No. 60/021,783, Jul. 15, 1996.

[51] Int. Cl.⁶ .................................................. G06K 7/10
[52] U.S. Cl. ................... 235/462.45; 359/201; 359/216; 359/217; 359/218; 359/219; 235/440; 235/454; 235/472; 235/445
[58] Field of Search ............................ 359/201, 216–219; 235/462.35, 467, 454, 470, 472, 439, 445, 440, 462.39, 462.4, 462.22, 462.36, 462.45

[56] References Cited

U.S. PATENT DOCUMENTS

| | | | |
|---|---|---|---|
| Re. 35,117 | 12/1995 | Rando et al. | 235/375 |
| 4,766,297 | 8/1988 | McMillan | 235/455 |
| 4,777,582 | 10/1988 | Sharrah | 362/205 |
| 4,795,224 | 1/1989 | Goto | 350/6.3 |
| 4,808,804 | 2/1989 | Krichever et al. | 235/462 |
| 4,835,374 | 5/1989 | Swartz et al. | 235/472 |
| 4,933,538 | 6/1990 | Heiman et al. | 235/462 |
| 4,939,355 | 7/1990 | Rando et al. | 235/467 |
| 4,939,356 | 7/1990 | Rando et al. | 235/467 |
| 4,967,076 | 10/1990 | Schuhmacher et al. | 250/236 |
| 5,000,529 | 3/1991 | Katoh et al. | 350/6.7 |
| 5,034,847 | 7/1991 | Brain | 362/205 |
| 5,105,070 | 4/1992 | Wike, Jr. et al. | 235/467 |
| 5,132,523 | 7/1992 | Bassett | 235/462 |
| 5,146,463 | 9/1992 | Rando | 372/24 |
| 5,151,581 | 9/1992 | Krichever et al. | 235/467 |
| 5,175,421 | 12/1992 | Harris | 235/467 |
| 5,197,796 | 3/1993 | Moore | 362/202 |
| 5,198,650 | 3/1993 | Wike, Jr. | 235/472 |
| 5,206,491 | 4/1993 | Katoh et al. | 235/467 |
| 5,214,270 | 5/1993 | Rando | 235/472 |
| 5,223,700 | 6/1993 | Takenaka | 235/467 |
| 5,229,591 | 7/1993 | Heiman et al. | 235/472 |
| 5,250,791 | 10/1993 | Heiman et al. | 235/472 |
| 5,314,631 | 5/1994 | Katoh et al. | 235/467 |
| 5,340,971 | 8/1994 | Rockstein et al. | 235/472 |
| 5,468,951 | 11/1995 | Knowles et al. | 235/472 |
| 5,477,044 | 12/1995 | Aragon | 235/472 |
| 5,504,316 | 4/1996 | Bridgelall et al. | 235/462 |
| 5,528,022 | 6/1996 | Nakazawa | 235/436 |
| 5,637,852 | 6/1997 | Knowles et al. | 235/462 |
| 5,693,930 | 12/1997 | Katoh et al. | 235/467 |
| 5,705,802 | 1/1998 | Bobba et al. | 235/467 |
| 5,719,385 | 2/1998 | Wike, Jr. et al. | 235/467 |
| 5,740,804 | 4/1998 | Cerofolini | 128/660.1 |

*Primary Examiner*—Donald Hajec
*Assistant Examiner*—Daniel Felten
*Attorney, Agent, or Firm*—Lyon & Lyon LLP

[57] ABSTRACT

A scanner with multiple modes of operation producing two or more distinct scan patterns, with each scan pattern optimized for different modes of operation with a manually actuated switching mechanism whereby the operator may readily select a desired scan pattern. The switching mechanism may operate by mechanically moving one set of scan pattern generating optics out of the optical path of the scanner and/or moving another set of scan pattern generating optics into the optical path. Alternatively, the different sets of scan pattern generating optics may remain stationary while the optical path of the scanner is moved. In either case the operator may choose from among two or more distinct scan patterns the scan pattern most appropriate to the scanning application at hand.

17 Claims, 5 Drawing Sheets

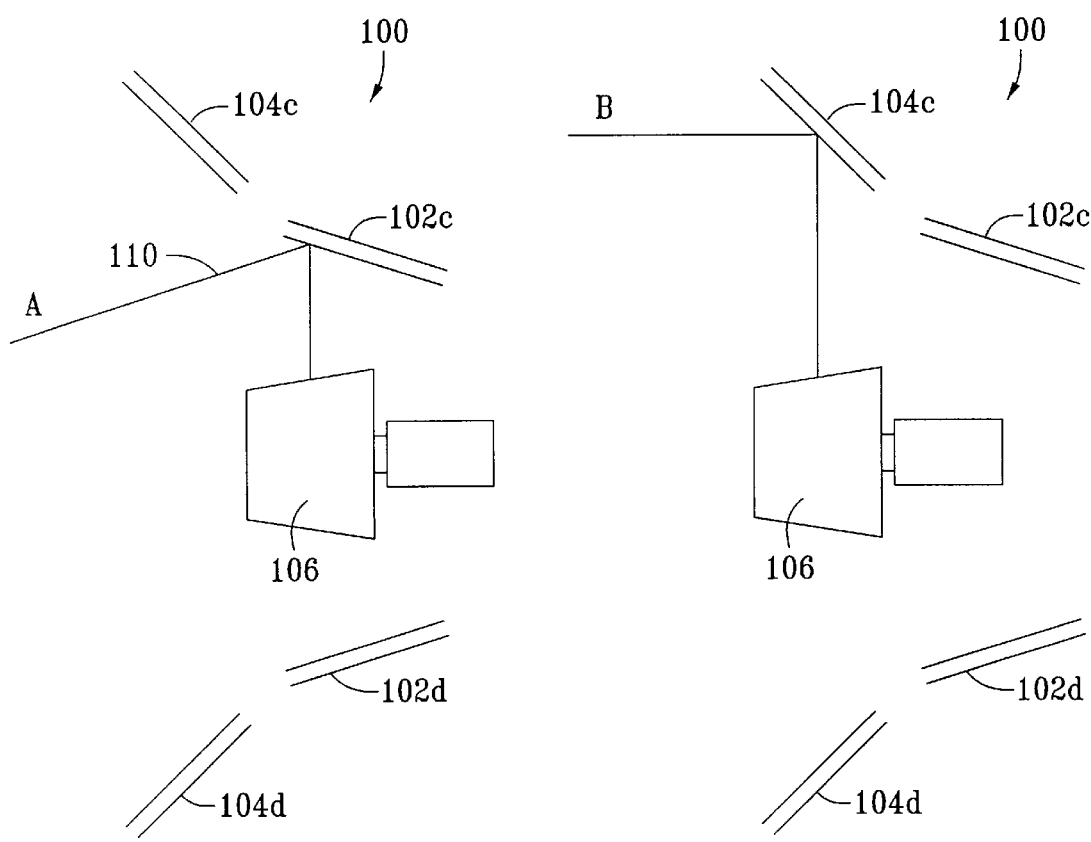

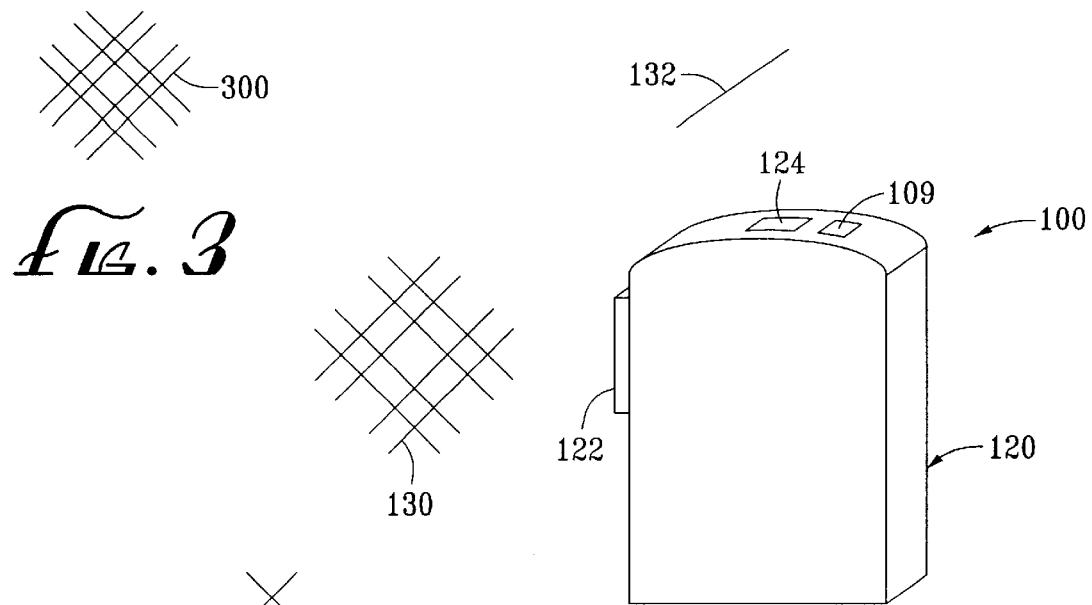
FIG. 3
FIG. 4
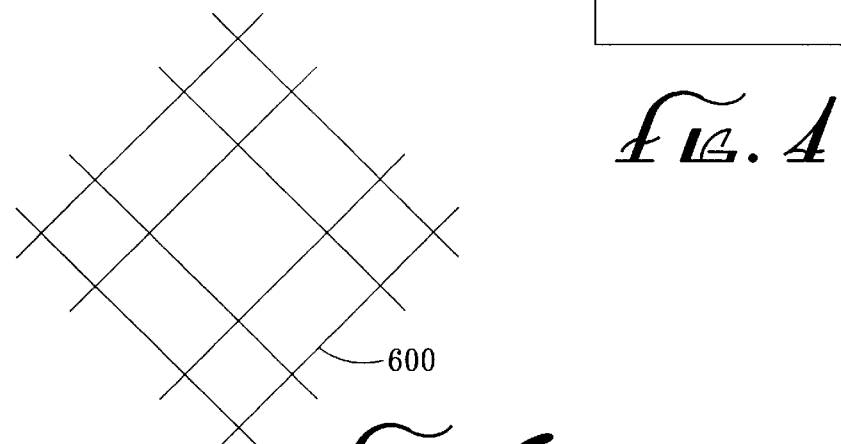
FIG. 6
FIG. 7
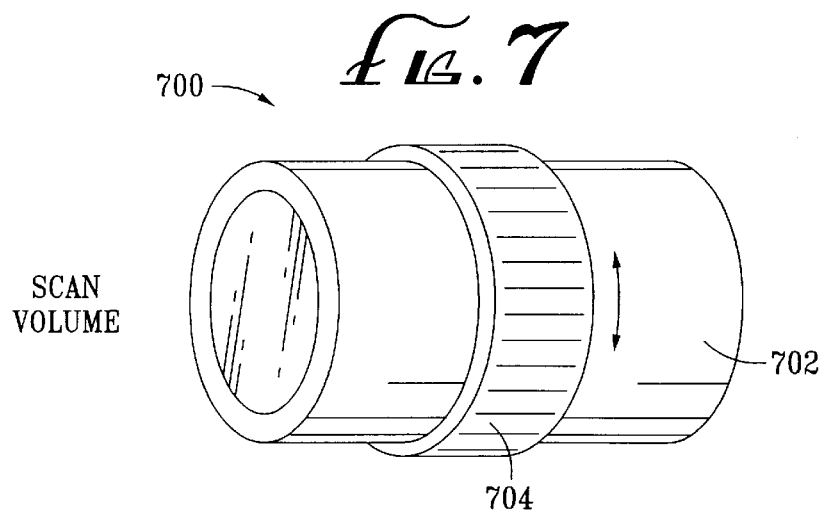

BARCODE SCANNER WITH MANUALLY SWITCHABLE SCAN PATTERNS

This application is a continuing application of provisional application Ser. No. 60/021,783 filed Jul. 15, 1996.

DESCRIPTION

Background

The field of the present invention relates to data readers, such as scanners and barcode reading devices.

A barcode label comprises a series of parallel dark bars of varying widths with intervening light spaces, also of varying widths. The information encoded in the barcode is represented by the specific sequence of bar and space widths, the precise nature of this representation depending on which particular barcode symbology is in use. Typical methods for reading barcodes comprise generation of an electronic signal wherein a signal voltage alternates between two preset voltage levels, one representing a dark bar and the other representing a light space. The temporal widths of these alternating pulses of high and low voltage levels correspond to the spatial widths of the bars and spaces. This temporal sequence of alternating voltage pulses of varying widths is presented to an electronic decoding apparatus for decoding.

A common method for converting the spatial bar/space sequence into a temporal high/low voltage sequence is the method of barcode reading. Spot scanners are one type of barcode reader in which a source of illumination is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in spot scanners is typically a coherent light source (such as a laser or laser diode) but may compromise a non-coherent light source (such as a light emitting diode). A laser illumination source offers the advantages of high intensity illumination which may allow barcodes to be read over a large range of distances from the barcode scanner (large depth of field) and under a wide range of background illumination conditions.

The reading spot of the scanner may be manually moved across the barcode (this type of reader being typically referred to as a wand), or automatically moved across the barcode in a controlled pattern. A scanning mechanism, which is part of the scan engine, may comprise a rotating mirror facet wheel, an oscillating mirror, or other mechanism for repetitively moving the illumination beam for automatically scanning the illumination beam across the barcode. The path followed by the scanned illumination beam is referred to as a scan line. Typically, an individual scan line must extend across the barcode for the barcode to be successfully read, unless specialized piecing software or electronics are utilized. Such a piecing mechanism, commonly known as stitching, is capable of taking partial portions of barcodes and assembling them into a complete code. In addition to the scan engine, a barcode scanner may also employ a set of scan pattern generating optics to produce a multiplicity of scan lines in various directions from the scanner and at varying orientations, thereby allowing barcodes to be read over a large angular field of view and over a wide range of orientations (i.e., a multi-dimensional scan pattern). The scan pattern generating optics typically comprise a set of mirrors aligned at varying angles, each of which intercepts the illumination beam during a portion of its motion and projects it into the region in front of the barcode scanner, hereinafter referred to as the scan volume. Each mirror in the set, in conjunction with the scan engine, produces a scan line at a particular position and at a particular orientation.

Another type of data reader is the line scanner, in which an entire barcode is focused onto a multi-element photodetector array and the image of the barcode is detected. The photodetector array may comprise a CCD array (charge coupled device), a CMOS active pixel sensor array, or other multi-element photodetector array. This type of reader may also include a light source to illuminate the barcode to enhance signal response corresponding to the image. The imaging optics which produce an image of the barcode on the photodetector array can alternatively be thought of as projecting an image of the photodetector array (a "virtual scan line") into the scan volume in a manner analogous to the scan line produced by a spot scanner. Further, scan pattern generating optics may be used to project multiple virtual scan lines into the scan volume in various directions and at varying orientations, thereby generating a virtual scan pattern, such as described in U.S. Pat. No. 5,446,271.

For purposes of this description, "scanner" shall refer to data readers of both the spot scanner type and the line scanner imaging type. This description will focus on barcode reading, but is generally applicable to any type of symbol reading or object identification.

From an operational point of view, barcode scanners are typically operated in one of two modes, fixed or portable. In the fixed mode of operation, often referred to as sweep scanning, the barcode scanner is fixed while barcoded objects are moved through a relatively large scan volume. In the portable mode of operation the barcode scanner is moved or aimed onto the barcode label for reading.

In the fixed mode of operation, a relatively wide angular field of view is preferred so that a barcode label can be read from the largest possible fraction of the surface of the barcoded object. Since objects are often swept through the scan volume in random orientations, a multi-dimensional pattern is necessary to read the barcode. In addition, a high scan rate is desirable to allow successful reading of barcodes which are swept through the scan volume quickly.

In a portable hand held scanner, a simpler scan pattern or a single scan line is often sufficient since the relatively small portable barcode scanner can be rotated to orient the scan line correctly across the barcode. A relatively small angular field of view is desirable in this mode of operation. A longer depth of field may also be desirable to allow the operator to read the barcode over a greater range of distances. The reduced angular field of view reduces the likelihood of inadvertent scanning of other barcode labels, but in turn leads to tighter aiming requirements. To facilitate proper orientation of the scan line relative to the barcode and aiming of the scanner, the scan line may be made sufficiently intense to be seen by the operator. Alternatively, a portable barcode scanner may be provided with pointer illuminators to facilitate aiming of the barcode scanner.

The present inventor has recognized that optimum parameters of operation for a fixed barcode scanner are frequently quite different from those of a portable barcode scanner. The particular parameters exhibiting major differences include: number, orientation, and position of scan lines; angular field of view; depth of field; scan speed; and illumination intensity. However, it may be desirable to produce a barcode scanner capable of both fixed and portable modes of operation. Previously this combined operation has been accomplished by compromising among the various requirements for fixed and portable modes of operation, yielding a barcode scanner with fixed (non-changeable) properties for use in both modes of operation but with performance inferior to barcode scanners designed for one mode of operation only.

SUMMARY OF THE INVENTION

The present invention is directed to a scanner with multiple modes of operation. The scanner preferably comprises two or more distinct scan patterns with each pattern optimized for different modes of operation and a manually actuated mechanism whereby the operator may readily select a desired scan pattern.

In a first embodiment, two or more sets of scan pattern generating optics are employed, each producing a different scan pattern. A manually actuated switching mechanism is provided whereby the operator may select which scan pattern is produced. The switching mechanism may operate by mechanically moving one set of scan pattern generating optics out of the optical path of the scanner and/or moving another set of scan pattern generating optics into the optical path. Alternatively, the different sets of scan pattern generating optics may remain stationary while the optical path of the scanner is moved. Alternately decoding may be selectively enabled and disabled to select the operating mode of a desired scan pattern. In any case the operator may choose, from among two or more distinct scan patterns, the scan pattern most appropriate to the scanning application at hand.

Such a barcode scanner offers the advantage of flexibility for the end user, in that one device can be used in different modes of operation, but does not suffer from some of the inferior performance characteristics of previously available fixed/portable barcode scanners.

BRIEF DESCRIPTION OF THE DRAWINGS

FIG. 2 is a side view of a barcode scanner with a rotating facet wheel scan mechanism and two sets of scan pattern generating optics according to an alternate embodiment.

FIG. 3 is an example of a scan pattern according to another alternate embodiment.

FIG. 4 is a perspective view of an example scanner housing with an external switch.

FIG. 5 is a side view of a barcode scanner with a rotating facet wheel scan engine and two sets of scan pattern generating optics according to another alternate embodiment.

FIG. 6 is an example of a scan pattern according to another alternate embodiment.

FIG. 7 is a front perspective view of a barcode scanner with a bezel switching mechanism for selecting a scan pattern according to another alternate embodiment.

DETAILED DESCRIPTION OF THE PREFERRED EMBODIMENTS

Figure 1:
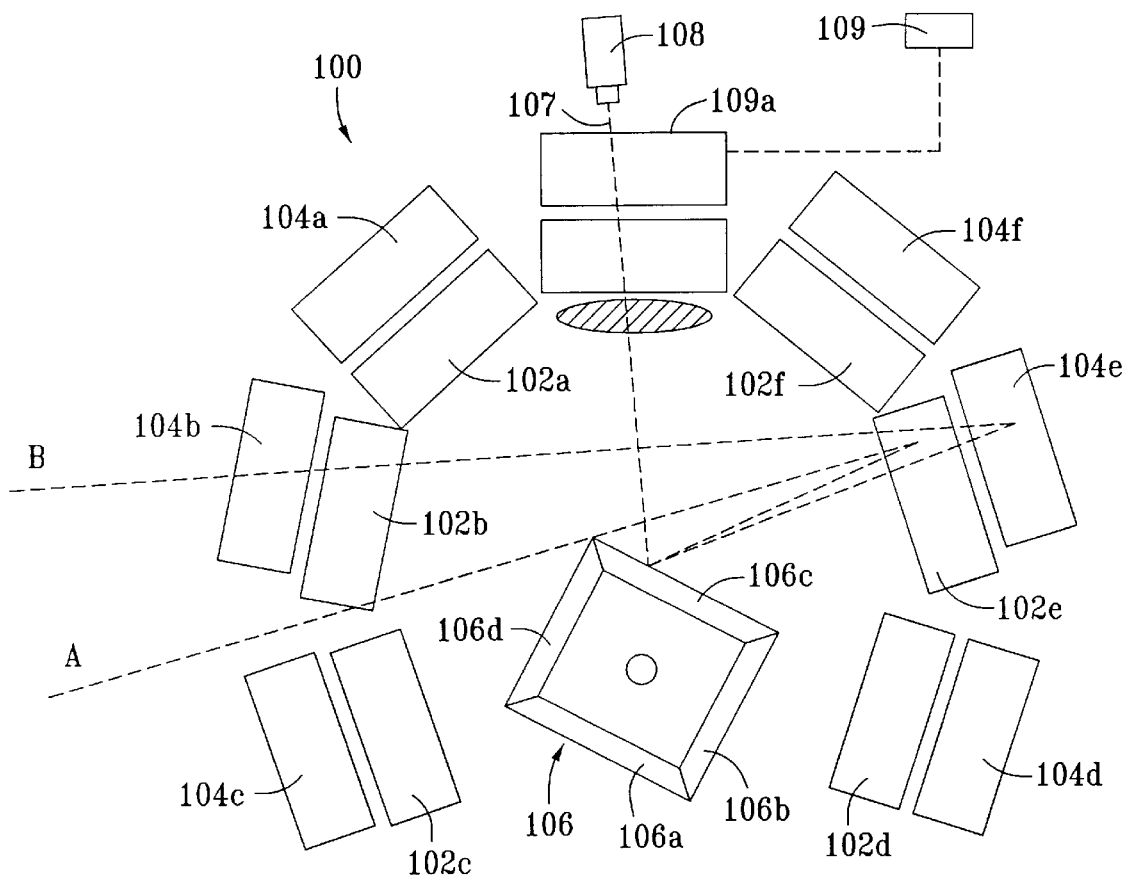
FIG. 1 is a top front view of a barcode scanner with a rotating facet wheel scan engine and two sets of scan pattern generating optics according to a preferred embodiment of the present invention.

FIGS. 1, 2, 4, and 5 show a preferred embodiment of a barcode scanner 100 with a manually switchable scan pattern, wherein the barcode scanner 100 includes a first scan pattern generating mirror set 102a–f, a second scan pattern generating mirror set 104a–f 1B, a rotating facet wheel scan mechanism 106, and a light source shown as laser diode 108. Laser diode 108 produces illumination beam 110, which is scanned by scan engine 106 across either scan pattern generating mirror set 102 or 104. The first pattern generating mirror set 102 may be aligned to produce a relatively dense, collimated scan pattern 300 as shown in FIG. 3, while the second pattern generating mirror set 104 may be aligned to produce a relatively less dense, more divergent scan pattern 600 as shown in FIG. 6. Though the scan patterns 300 and 600 are shown as examples of two scan patterns which may be generated, many different scan patterns may be employed without departing from the inventive concepts disclosed herein.

A switching mechanism, described below, may be employed in a preferred embodiment to switch between (A) pattern generating mirror set 102 with the operating position A depicted in FIG. 2 and (B) pattern generating mirror set 104 with the operating position B depicted in FIG. 5. The first operating position A employing pattern generating mirror set 102 may produce a scan pattern 300 (as shown in FIG. 3), while switching to the second operating position B employing pattern generating mirror set 104 produces scan pattern 600 (as shown in FIG. 6). In a preferred embodiment pattern generating mirror sets 102 and 104 are mounted within a single integral assembly (a "mirror basket") which is moved by the switching mechanism between the two operating positions A and B described above.

FIGS. 1 and 4 illustrate a first switching mechanism represented generally by a manually-operated switch or trigger 109 located on the outside of the scanner housing 120. Actuation of the switch 109 prompts movement of an optical control element 109a placed in the optical path of the beam 107 between the source 108 and the rotating mirror 106. When actuated, the optical control element 109a causes the scanning beam to switch from operating mode A to operating mode B and vice versa. The optical control element 109a may be electronically actuable, comprising for example a piezoelectric element for deflecting the beam 107 along different paths. Alternately the optical control element 109a may actuate mechanically, comprising for example a solenoid which moves a mirror for deflecting the beam 107 along different paths toward the rotating polygon 106 thereby producing different patterns through the window 122. Alternately, the different patterns may be directed out different windows (e.g. windows 122 and 124) in the scanner housing 120.

FIG. 7 depicts an external view of a preferred embodiment of a barcode scanner 700 with a housing 702 and a bezel 704. In this embodiment the switching mechanism is actuated by rotating bezel 704 with respect to housing 702, thereby moving the pattern generating mirror sets 102 and 104 between two operating positions, a first operating position selecting mirror set 102 and a second operating position selecting mirror set 104.

Alternatively, a switching mechanism may comprise mechanical actuator whereby the scan mechanism 106 itself is moved between two or more operating positions, as illustrated in FIGS. 2 and 5 while two or more scan pattern generating mirror sets 102, 104 remain stationary. In an alternate configuration, the switching mechanism may employ movable secondary steering optics to direct the illumination beam from the laser diode 108 onto one of two or more scan mechanisms, two or more tracks on a rotating holographic disk, two or more mirror sets on the same rotating shaft. In another alternative embodiment, the alignment of a single pattern generating mirror set may be altered by the switching mechanism, thereby producing distinct scan patterns.

Figure 1A:
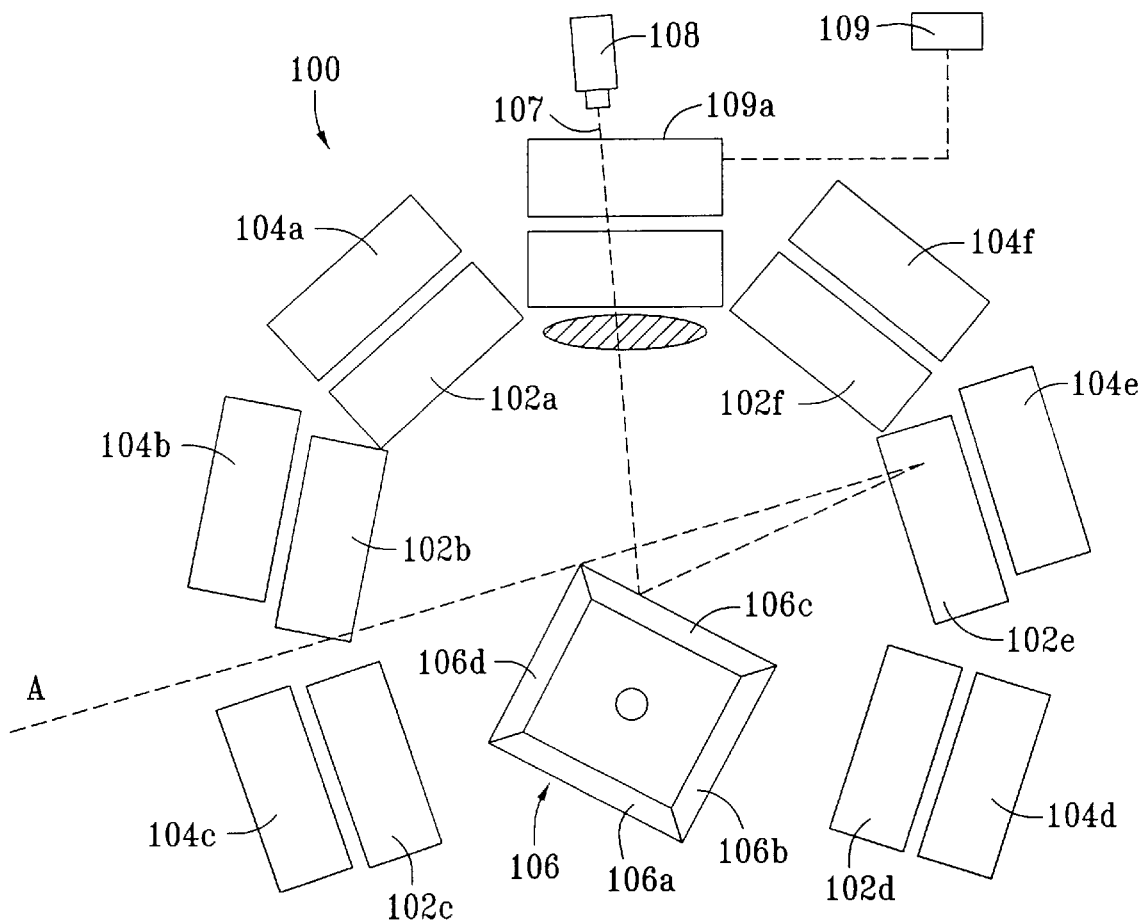
FIGS. 1A and 1B are top views of the scanner of FIG. 1 illustrating alternate operating modes.
Figure 1B:
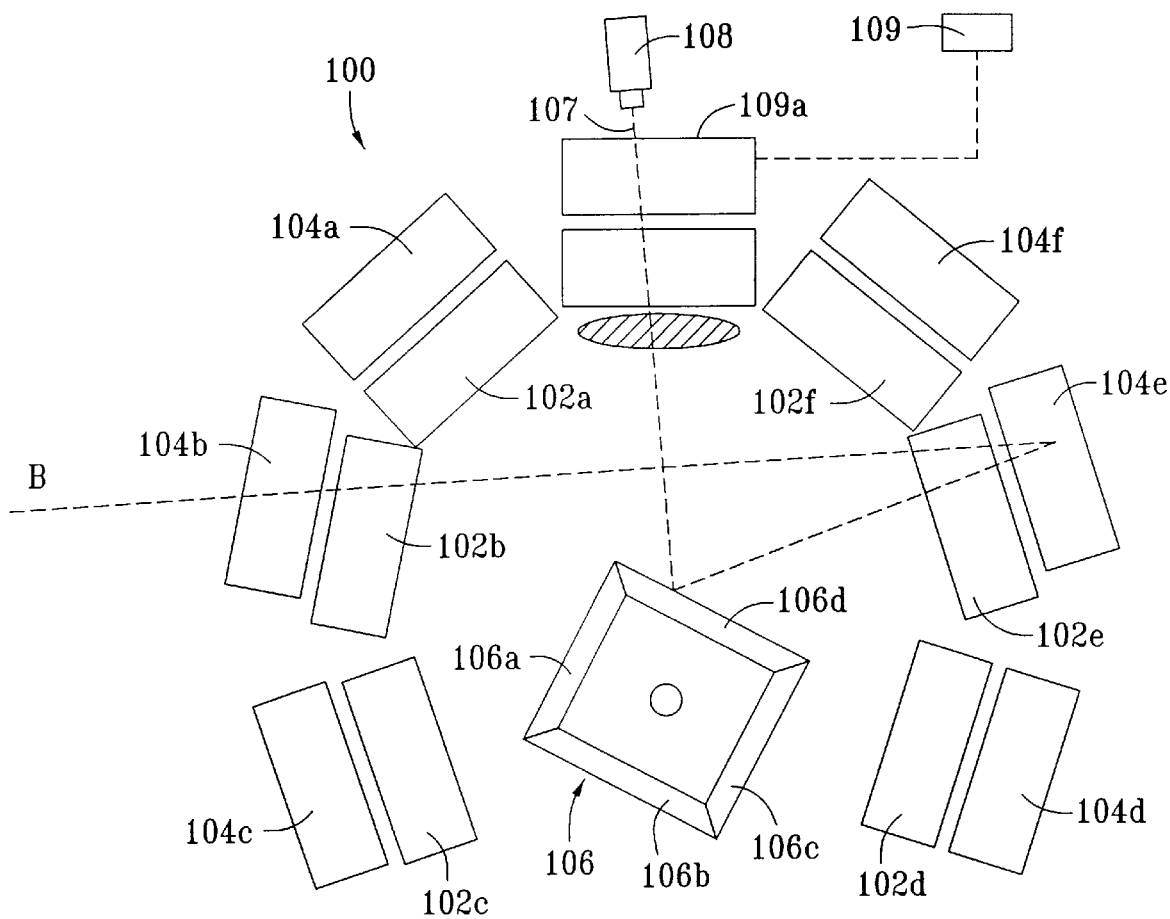

In another embodiment, an alternate operational mode for the scanner in FIG. 1, is illustrated in FIGS. 1A and 1B in which a single facet wheel scan mechanism 106 with facets 106a–d alternating among two or more angles is employed and arranged so that facets at distinct angles direct the illumination beam onto distinct pattern generating optics sets. The scan lines generated by the facets set at a particular angle comprise a single scan pattern, therefore the scanner may produce a distinct scan pattern for each combination of facet angle and pattern generating optics set. For example, the rotating mirror polygon 106 of FIG. 1 may comprise four mirror facets, 106a, 106b, 106c, 106d. FIGS. 1A and 1B illustrate this alternate operational method for the scanner 100 of FIG. 1 whereby the The mirror facets 106a and 106c are angled to direct the beam 107 only onto mirror set 102a–f to produce the (A) pattern as shown in FIG. 1A and mirror facets 106b and 106d are angled to direct the beam 107 only onto mirror set 104a–f to produce the (B) pattern as shown in FIG. 1B. If operated with a continuous illumination beam, all scan patterns would be present "simultaneously" (or more accurately, all patterns would be generated consecutively with individual scan line(s) of the patterns produced sequentially). By turning the illumination source on only during those intervals in which the illumination beam strikes facets of a particular angle, a selected one (or more) of the possible scan patterns may be selectively generated. By synchronizing on/off cycles of the illumination source to the rotation of the facet wheel, any of the scan patterns may be selected. In one such a configuration, the switching mechanism may be entirely electronic comprising altering the timing of the illumination source on/off cycles and the facet wheel rotation. This electronic control has the advantage of not requiring any mechanical movement of the pattern generating optics or scan mechanism (other than its scanning motion) to switch between scan patterns.

In an alternative embodiment of the present invention, the scan mechanism may comprise any means for repetitively scanning the illumination beam across the pattern generating mirror set(s), including but not limited to, a rotating mirror facet wheel, rotating holographic disk, rotating single facet mirror, an oscillating mirror, or an oscillating beam source. The scan pattern generating optics set may alternately comprise any set of optics configured to project the scanned beam from a scan mechanism into a scan volume, including but not limited to one or more mirrors, prisms, lenses, diffractive optics, or any combination thereof.

In another alternative embodiment, the switching mechanism may be manually actuated by any means capable of moving the components (mirror basket, scan engine, steering optics, etc.) for generating different scan patterns, including but not limited to a bezel, lever, knob, slide, or trigger. Alternately, the switching mechanism may be mechanically actuated by a motor, solenoid, or other actuator. In such a mechanically actuated embodiment, or in an electronic embodiment such as the one employing illumination source on/off cycling, the switching mechanism may be automatically triggered, for example when the scanner is picked up versus put down, moving versus motionless, or based on any other condition which may be used to distinguish fixed versus portable operation.

In addition, any of the preferred or alternative embodiments, other operating parameters of the scanner, including but not limited to illumination intensity, focusing, scan rate, signal processing parameters, or the like. The operating parameter may be automatically modified when the scan pattern is adjusted. For example, the laser power might be changed such as by varying the current to the light source via an analog/digital converter or a resistive controller. Beam focus may be controlled via an electronically controlled focusing mechanism (such as described in U.S. Pat. No. 5,479,011 incorporated by reference), an electro-mechanically actuated lens, or both. Scan rate may be regulated via suitable motor speed control electronics.

The scanning operation may be configured such that only one scan pattern is generated during a specific operational mode. The first scan pattern comprised of multiple scan lines in a complex pattern 130 (for fixed scanning) may be directed out the first window 122 and the second scan pattern comprised of a single scan line 132 (for hand held scanning) may be directed out the second window 124.

Rather than turning off one of the patterns, both scan patterns may be continuously (albeit in a technical sense sequentially when using a rotating polygon) generated regardless of the mode. In order to avoid inadvertent reading of a symbol, the decoding of the signal from the second scan pattern 132 through the second window 124 may be disabled except when the switch 109 is depressed. Such a disablement of the decoding may be achieved by gating the bar signal during the time period when the second scan pattern 132 of the single scan line through window 124 is produced. The decoding system is synchronized to the scanning mechanism thereby providing a precise signal as to what scan lines are being produced and it is just a matter of programming the decoder to be disabled or gated when the scan pattern 132 of the single scan line through window 124 is produced. Utilizing gating of the decoding signal as a means for enabling/disabling reading by certain scan lines provides an easy and inexpensive method of switching between scanning modes. Similarly, the scan pattern 130 through the first window 122 may be selectively enabled only when the switch 109 is not depressed.

Signal processing parameters may also be further adjusted to enhance operation within each of the modes. For example the bandwidth may be lowered to reduce depth of field or raised to extend depth of field. The gain may be increased to increase depth of field. Signal threshold may be adjusted to compensate for low contrast bar code.

Depending upon the application, it may be desirable that the hand held operation be enabled and optimized for longer range scanning. In such an application, it may be desirable to adjust parameters as follows to enhance the longer range scanning operation: higher beam power, a slower scan rate, long range focusing, and/or signal processing.

While embodiments and applications of this invention have been shown and described, it would be apparent to those skilled in the art that other modifications are possible without departing from the inventive concepts herein. The invention, therefore, is not to be restricted except in the spirit of the claims that follow.

I claim:

1. A method for data reading comprising the steps of projecting a beam of light along an outgoing optical path within a housing of a scanner;

providing the housing with a rotating bezel;

switching between a first operating mode for data reading and a second operating mode for data reading by manually rotating the bezel;

while in the first operating mode, adjusting operating parameters for optimizing first mode operation;

while in the second operating mode, adjusting operating parameters for optimizing second mode operation.

2. A method for data reading according to claim 1 wherein the step of switching comprises moving the pattern mirrors.

3. A method for data reading according to claim 1 wherein the first operating mode comprises generating a first scan pattern and the second operating mode comprises generating a second scan pattern distinct from the first scan pattern.

4. A method for data reading comprising the steps of projecting a beam of light along an outgoing optical path;

passing the beam through an optical control element;

switching between a first operating mode for data reading and a second operating mode for data reading by actuating a manually actuated switch;

while in the first operating mode, adjusting operating parameters for optimizing first mode operation;

while in the second operating mode, adjusting operating parameters for optimizing second mode operation;

wherein the first operating mode comprises generating a first scan pattern and the second operating mode comprises generating a second scan pattern distinct from the first scan pattern;

forming the beam from a laser diode;

directing the beam onto a scanning mechanism;

scanning the beam with the scanning mechanism across a first set of pattern mirrors to generate the first scan pattern;

switching to the second mode by actuating the switch;

scanning the beam with the scanning mechanism across a second set of pattern mirrors to generate the second scan pattern.

5. A method for data reading according to claim 1 further comprising optimizing the first operating mode for hand held scanner operation by producing a single scan line, a reduced angular field of view, and a relatively large depth of field;

optimizing the second operating mode for fixed scanner operation by producing a complex scan pattern with multiple scan lines.

6. A data reading device comprising a housing;

a beam scanning mechanism within the housing;

a light source producing at least one reading beam directed onto the beam scanning mechanism;

first generating optics, comprising a first pattern mirror set, for generating a first scan pattern;

second generating optics, comprising a second pattern mirror set, for generating a second scan pattern;

wherein the first scan pattern is optimized for fixed mode scanning and the second scan pattern is optimized for portable mode scanning;

control means for switching between the first and second scan patterns by moving the pattern mirrors between first and second operating positions, whereby (a) in the first operating position, pattern mirrors are moved into position for producing the first scan pattern off the first pattern mirror set and (b) in the second operating position, the pattern mirrors are moved into position for producing the second scan pattern off the second pattern mirror set;

a manual actuation mechanism for signaling the control means to switch between the first and second scan patterns.

7. A scanner comprising a housing;

means in the housing for generating a reading beam;

a plurality of pattern mirrors mounted within the housing;

means for scanning the reading beam over the pattern mirrors thereby selectively generating a first scan pattern or a second scan pattern distinct from the first scan pattern;

control means for switching between the first and second scan patterns, wherein the housing comprises a handheld scanner housing having a rotating bezel wherein rotation of the bezel moves the pattern mirrors between first and second operating positions, the first operating position selecting a first mirror set and the second operating position selecting a second mirror set.

8. A method for data reading according to claim 3 further comprising forming the beam from a laser diode;

directing the beam onto a scanning mechanism;

scanning the beam with the scanning mechanism across a first set of pattern mirrors to generate the first scan pattern;

switching to the second mode by rotating the bezel;

scanning the beam with the scanning mechanism across a second set of pattern mirrors to generate the second scan pattern.

9. A method for data reading according to claim 4 wherein the step of switching comprises moving the pattern mirrors.

10. A method for data reading according to claim 4 further comprising optimizing the first operating mode for hand held scanner operation by producing a single scan line, a reduced angular field of view, and a relatively large depth of field;

optimizing the second operating mode for fixed scanner operation by producing a complex scan pattern with multiple scan lines.

11. A method of data reading according to claim 4 further comprising enclosing the pattern mirrors within a housing;

providing the housing with a rotating bezel;

wherein the step of actuating the manually actuated switch comprises rotating the bezel.

12. A data reading device according to claim 6 wherein the manual actuation mechanism comprises a rotating bezel on the housing wherein rotation of the bezel causes the pattern mirrors to move between first and second operating positions.

13. A method for data reading comprising the steps of projecting a beam of light along an outgoing optical path;

directing the beam onto a scanning mechanism;

switching between a first operating mode and a second operating mode by moving the scan mechanism between a first operating position and a second operating position;

in the first operating mode with the scan mechanism in a first position, scanning the beam with the scanning mechanism across a first pattern mirror set to generate a first scan pattern optimized for handheld scanning;

moving the scan mechanism to a second position;

in the second operating mode with the scanning mechanism in the second operating position, scanning the beam with the scanning mechanism across a second pattern mirror set to generate a second scan pattern.

14. A method according to claim 13 further comprising forming the beam from a laser diode.

15. A method according to claim 13 herein the first operating mode comprises generating a first scan pattern and the second operating mode comprises generating a second scan pattern distinct from the first scan pattern.

16. A method according to claim 13 further comprising while in the first operating mode, adjusting operating parameters for optimizing the first operating mode;

while in the second operating mode, adjusting operating parameters for optimizing the second operating mode.

17. A method according to claim 13 further comprising providing a housing with a rotating bezel;

locating the scanning mechanism in the housing;

moving the scanning mechanism between the first operating position and the second operating position by manually rotating the bezel.

\* \* \* \* \*